(12) United States Patent
Battel

(10) Patent No.: US 12,029,347 B2
(45) Date of Patent: *Jul. 9, 2024

(54) FOLDING GRILL DEVICE HAVING GAS-OPERATED HEATING DEVICE

(71) Applicant: VENNSKAP GMBH & CO. KG, Meerbusch (DE)

(72) Inventor: Christian Battel, Meerbusch (DE)

(73) Assignee: VENNSKAP GMBH & CO. KG, Meerbusch (DE)

( * ) Notice: Subject to any disclaimer, the term of this patent is extended or adjusted under 35 U.S.C. 154(b) by 70 days.

This patent is subject to a terminal disclaimer.

(21) Appl. No.: 17/881,616

(22) Filed: Aug. 5, 2022

(65) Prior Publication Data

US 2022/0369863 A1 Nov. 24, 2022

Related U.S. Application Data

(63) Continuation of application No. 17/049,337, filed as application No. PCT/EP2019/060335 on Apr. 23, 2019, now Pat. No. 11,439,274.

(30) Foreign Application Priority Data

Apr. 23, 2018 (DE) ...................... 10 2018 109 739.5

(51) Int. Cl.
*A47J 37/07* (2006.01)
*F24C 3/14* (2021.01)

(52) U.S. Cl.
CPC ....... *A47J 37/0713* (2013.01); *A47J 37/0763* (2013.01); *F24C 3/14* (2013.01); *A47J 2037/0777* (2013.01)

(58) Field of Classification Search
CPC ................ A47J 37/0713; A47J 37/0763; A47J 2037/0777; F24C 3/14
See application file for complete search history.

(56) References Cited

U.S. PATENT DOCUMENTS

| 5,575,195 | A | 11/1996 | Foxford |
| 5,603,256 | A | 2/1997 | Charlson et al. |
| 6,425,387 | B1 | 7/2002 | Rohback, Jr. |

(Continued)

FOREIGN PATENT DOCUMENTS

| CA | 1279540 C | 1/1991 |
| CH | 709 799 A2 | 12/2015 |

(Continued)

*Primary Examiner* — Alfred Basichas
(74) *Attorney, Agent, or Firm* — Norman B. Thot

(57) ABSTRACT

A foldable grill device includes a cooking grill, a heating device which is operated with a flammable gas, and a carrier frame which holds the cooking grill. The carrier frame includes plate-shaped walls, and at least two opposite bearing elements in which the heating device is held to be releasable. The plate shaped walls are interconnected via releasable plug-in connections so that a release of the releasable plug-in connections converts the foldable grill device into a transport and storage state in which the plate-shaped walls and the cooking grill are placed one on top of another to form a flat stack. The heating device is provided as a tubular fuel rod which a first end, a second end which is arranged opposite to the first end, and a plurality of outlet openings for an outflow of the flammable gas.

20 Claims, 7 Drawing Sheets

(56) References Cited

U.S. PATENT DOCUMENTS

| 11,439,274 | B2* | 9/2022 | Battel | A47J 37/0763 |
| 2010/0288261 | A1 | 11/2010 | Jones | |
| 2015/0289715 | A1 | 10/2015 | Hartkorn | |
| 2016/0022093 | A1* | 1/2016 | Gramola | A47J 37/0786 |
| | | | | 99/422 |
| 2016/0069564 | A1 | 3/2016 | Aiimed | |

FOREIGN PATENT DOCUMENTS

| CH | 712 061 A2 | 7/2017 |
| CN | 204598523 U | 8/2015 |
| CN | 105101853 A | 11/2015 |
| DE | 199 63 143 A1 | 7/2001 |
| EP | 2 114 220 B1 | 6/2011 |

* cited by examiner

FOLDING GRILL DEVICE HAVING GAS-OPERATED HEATING DEVICE

CROSS REFERENCE TO PRIOR APPLICATIONS

This application is a continuation of application Ser. No. 17/049,337, filed on Oct. 21, 2020, which is a is a U.S. National Phase application under 35 U.S.C. § 371 of International Application No. PCT/EP2019/060335, filed on Apr. 23, 2019 and which claims benefit to German Patent Application No. 10 2018 109 739.5, filed on Apr. 23, 2018. The International Application was published in German on Oct. 31, 2019 as WO 2019/206887 A1 under PCT Article 21(2).

FIELD

The present invention relates to a foldable grill device consisting of a carrier frame and a cooking grill which is held by the carrier frame, wherein the carrier frame is composed of multiple plate-shaped walls which are interconnected by releasable plug-in connections. The grill device is can be converted into a transport and storage state by releasing the plug-in connections in which the plate-shaped walls and the cooking grill are placed one on top of another to form a flat stack.

BACKGROUND

Foldable grill devices are used in a mobile and portable manner because they can be set up and dismantled easily and quickly. Their individual parts can be fitted together simply and preferably without any tools in order to assemble a sturdy grill device. Individual parts can at the same time also be released from one another again in a simple manner in order to, for example, store and/or transport them in a relatively flat stack. CH 709799 A2 describes, for example, such a portable grill device. The portable grill device includes four side walls, a fifth side wall which is designed as a bottom part, a cooking grill to support the items to be grilled, and a charcoal grill for receiving the charcoal which is ignited and which serves as a heat source. The four side walls are connected together in a positive locking manner by means of a plug-in connection, the cooking grill being in turn connected in a positive locking manner to two side walls which are arranged parallel to one another. The portable grill device can be broken down into flat individual parts and is consequently suitable for outdoor activities, in particular for camping or for walking tours. The portable grill device can in this case be stowed in a space-saving manner, for example, in a backpack.

A disadvantage of the above or similar known grill devices is, however, that they are operated with charcoal which is placed on the charcoal grill in order to provide the heat necessary for grilling. This means that a user of the mobile grill device must bring a supply of charcoal with him/her on the walking tours. The stowage space in the user's backpack is thereby restricted, and the weight of the baggage is unnecessarily increased for the user by the charcoal that must be taken along. Charcoal has the additional disadvantage that an open fire is created when grilling. Flying sparks caused by the charcoal can cause fires, in particular in areas where there is a high degree of dryness. The operation of such a mobile grill device can be quite dangerous for the user if the dry surrounding area around the portable grill device catches fire. It can also be generally prohibited in certain areas to grill over open fires so that the use of portable grill devices operated with charcoal is not allowed.

SUMMARY

An aspect of the present invention is to provide a compact, foldable grill device which is stowable in a space-saving manner and which can nevertheless be operated safely by a user.

In an embodiment, the present invention provides a foldable grill device which includes a cooking grill, a heating device which is configured to be operated with a flammable gas, and a carrier frame which is configured hold the cooking grill. The carrier frame comprises a plurality of plate-shaped walls, and at least two opposite bearing elements in which the heating device is held so as to be releasable. The plurality of plate shaped walls are interconnected via releasable plug-in connections so that a release of the releasable plug-in connections converts the foldable grill device into a transport and storage state in which the plurality of plate-shaped walls and the cooking grill are placed one on top of another to form a flat stack. The heating device is provided as a tubular fuel rod which a first end, a second end which is arranged opposite to the first end, and a plurality of outlet openings for an outflow of the flammable gas. A connection for a storage container which comprises the flammable gas in a liquid state is arranged on the first end. The tubular fuel rod is closed in a gas-tight manner and has a flattening at the second end. The two opposite bearing elements each are formed by an opening in the carrier frame which is configured so that a portion of the tubular fuel rod is insertable with a play. One of the at least two bearing elements is provided as a slot in the carrier frame through which the flattening of the tubular fuel rod is pushed. The tubular fuel rod comprises at least one blocking element. A movement of the tubular fuel rod in a direction between the two opposite bearing elements is delimited by the at least one blocking element on the tubular fuel rod. The at least one blocking element comprises at least one of an outer blocking element which is arranged on an outside of the carrier frame and an inner blocking element which is arranged on an inside of the carrier frame.

BRIEF DESCRIPTION OF THE DRAWINGS

The present invention is described in greater detail below on the basis of embodiments and of the drawings in which.

DETAILED DESCRIPTION

Figure 1:
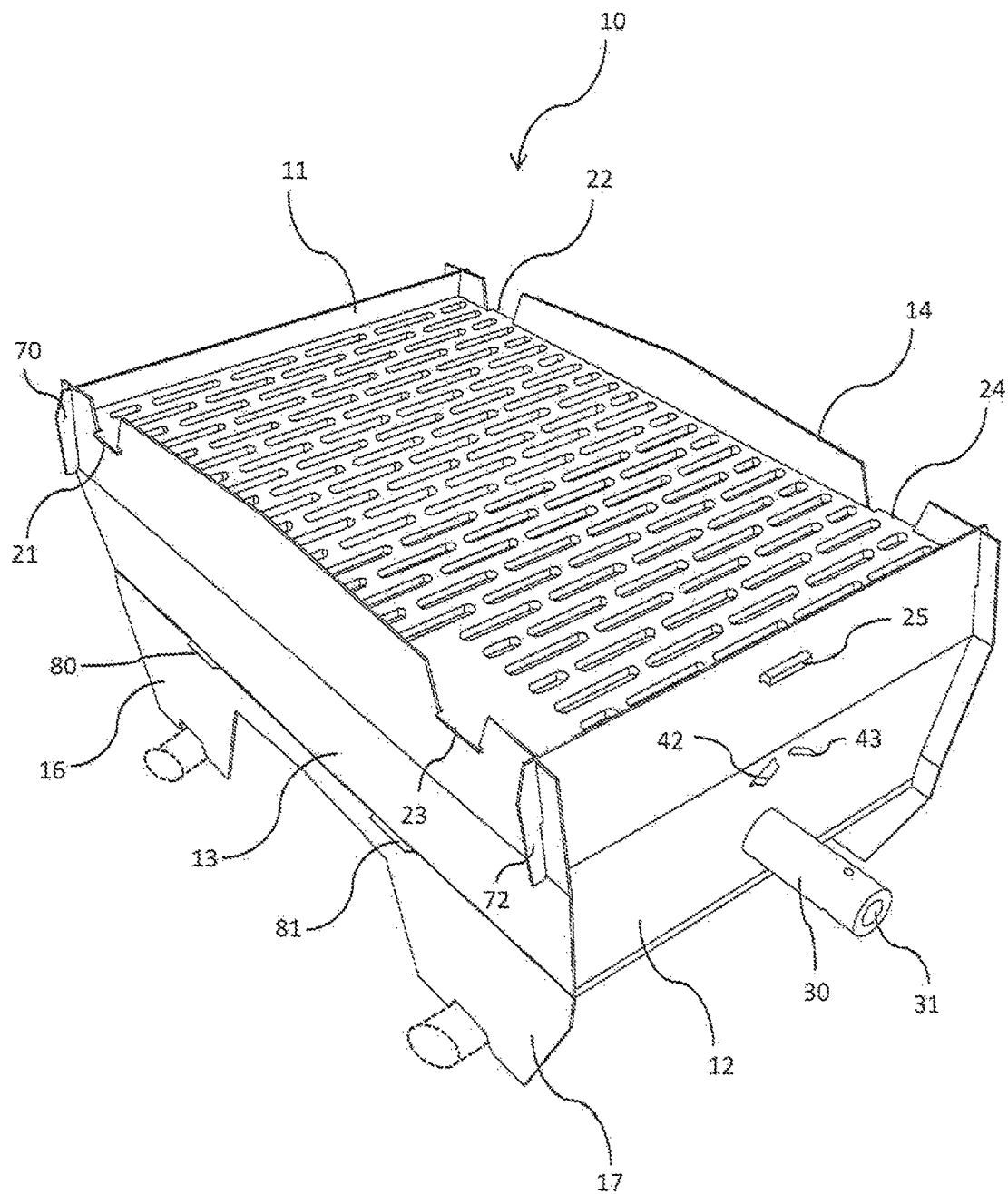
FIG. 1 shows a perspective representation of an embodiment of a grill device according to the present invention.
Figure 2:
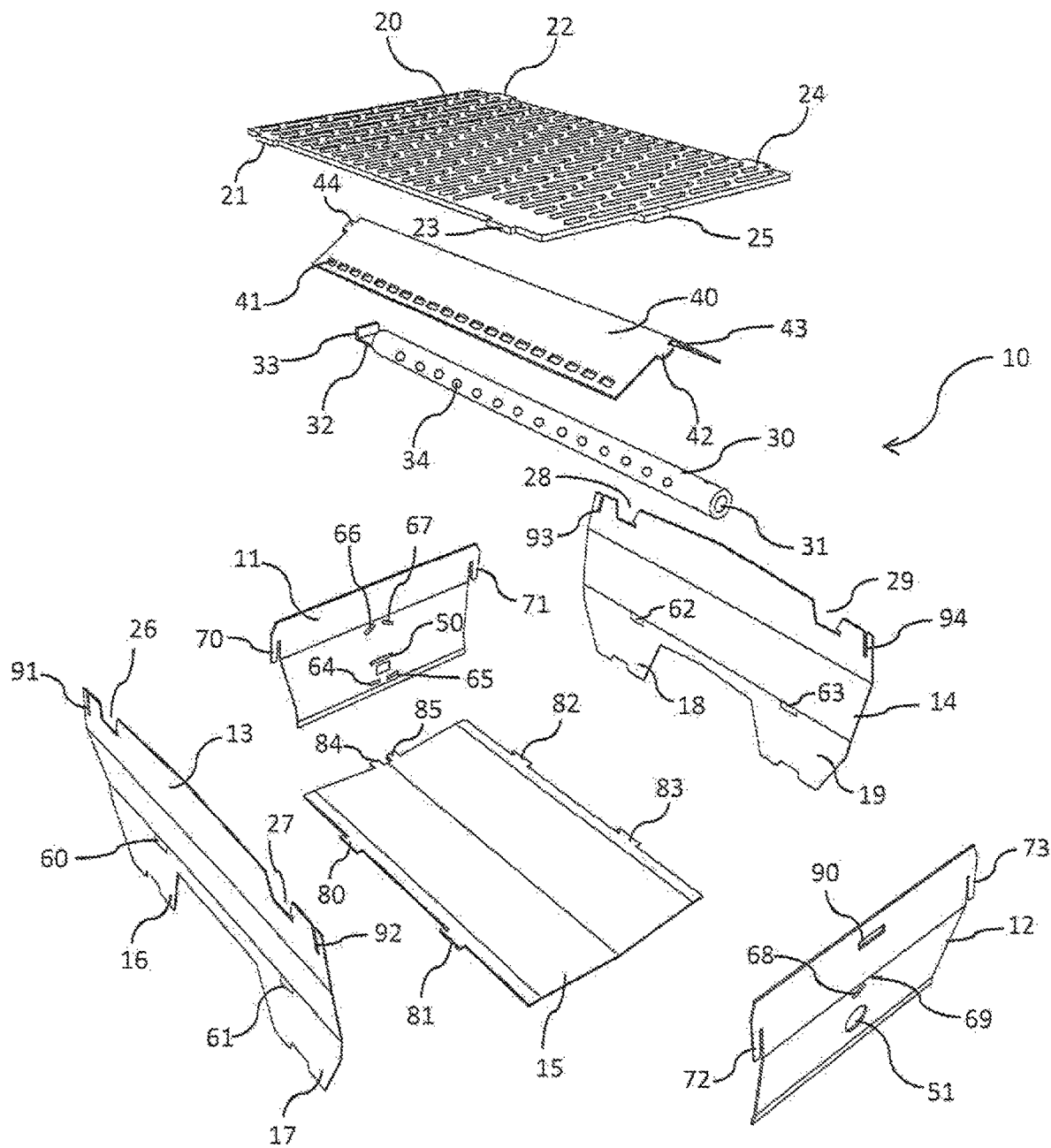
FIG. 2 shows an exploded representation of the grill device according to FIG. 1.

The grill device according to the present invention is foldable. To this end, the grill device consists of a carrier frame and a cooking grill which is held by the carrier frame, wherein the carrier frame is composed of multiple plate-shaped walls which are interconnected by releasable plug-in connections. The plate-shaped walls can, for example, consist of stainless steel sheets or another heat-resistant material. The thickness of the sheets used lies between 1 and 8 mm, whereby it is also possible for the cooking grill to in particular be provided thicker than the walls of the carrier frame.

As a result of releasing the plug-in connections, the grill device is convertible into a transport and storage state in which the plate-shaped walls and the cooking grill are placed one on top of another to form a flat stack. The plate-shaped walls can in this case be provided completely flat without any elevations or projections, as a result of which they produce a particularly flat stack when placed one on top of another. Walls with smaller elevations or projections are still also deemed to constitute plate-shaped walls within the context of the present invention. It can also be provided, for example, that in such a stack made up of individual parts, a projection in a wall engages in a recess in the nearest wall. Even slightly angled plates are to be deemed as plate-shaped walls within the context of the present invention. Such an angulation can, for example, be within the range of approximately 179° to 160°. Sheets that are angled in opposite directions can also additionally be used.

It is material to the present invention that, when placed one on top of another, the individual parts of the foldable grill device produce a flat stack, the height of which is smaller many times over than its dimensions in other directions.

The present invention provides that a foldable grill device with a carrier frame formed in this manner comprises at least two opposite bearing elements in which a heating device, which is operated with a flammable gas, is held so as to be releasable. The present invention consequently combines the advantages of a foldable grill device with a fluid-operated heating device such as a gas burner. A conventional gas burner is in this case not, however, simply placed under a cooking grill, as could be done in the case of known foldable grill devices. Special bearing elements are much rather provided on the carrier frame of the grill device in which a heating device, which is operated with a flammable fluid, is held so as to be releasable. The heating device is thus held in relation to the carrier frame, which provides safety when the grill device is being operated.

The heating device is at the same time, however, releasable from the carrier frame, for example, without separate fastening devices having to be released. The releasing of the heating device can consequently, for example, be effected without a tool. The heating device is consequently in particular not screw-connected, riveted or even welded-on, but is releasable from the carrier frame simply as part of the foldable grill device. Positive locking plug-in connections can, for example, be provided for this purpose, which plug-in connections are, however, again releasable as a result of simple pulling and/or turning movements. The heating device can also be removed in this way and accommodated in a stack of individual parts.

The design according to the present invention of a grill device provides multiple significant advantages, in particular for outdoor activities such as walking tours or camping. All individual parts of the grill device can be stowed and transported simply, compactly and securely, for example, in a user's backpack. There is also advantageously no need to stow charcoal in the backpack which would otherwise be required for a variety of grilling operations. Only a storage container with the flammable gas in liquid form must be taken along when using the grill device according to the present invention. The storage container can be stowed in a space-saving manner in the backpack.

The problem of disposing of used charcoal in a fire-proof manner also does not exist. The grill device can additionally also be used in areas in which an open fire with wood or charcoal is prohibited.

A further advantage of the grill device according to the present invention is that safety is considerably improved for the user during the grilling operation. An uncontrolled flying spark, as is the case, for example, with burning charcoal, can be prevented in an advantageous manner by using the heating device which is operable with the flammable fluid. In a dangerous situation, the user is immediately able to contain a flame by switching off the gas supply and thereby minimize or even prevent the risk of fire.

By attaching the heating device to the carrier frame of the grill device, it is furthermore possible to provide that the outflow direction of the gas remains substantially constant and flows to the cooking grill in a target-oriented manner. The items to be grilled can consequently be positioned precisely above the heat source so that the items to be grilled can be cooked and heated well as in the case of conventional gas grills.

The mobile grill device of the invention is consequently an easily assembled and disassembled point for heating, grilling and/or cooking which is in particular suitable for camping or for hiking tours. Individual parts of the mobile grill device can be fitted or removed without a large amount of effort. The individual parts are compact, sturdy assembly elements which can be stowed in a space-saving manner, for example, in a backpack or in a bag. The fitting and removal of the individual parts can be carried out in a few minutes by the user, and additional tools for fitting and removal can, for example, be dispensed with because the grill device does not, for example, use screw elements.

In an embodiment of the present invention, the heating device can, for example, be designed as a tubular fuel rod having multiple outlet openings for the outflow of flammable gas. The outflow openings are arranged, for example, spaced apart from one another, in one or multiple rows and can, for example, be directed in the direction of the cooking grill so that the items for grilling are heated in a desired even manner. The advantage of such a fuel rod is that it is easy to handle and is attachable to the carrier frame of the grill device in bearing elements. The fuel rod can also be accommodated well in a stack made up of individual parts of the grill device.

The heating device comprises a connection for a storage container with flammable gas in the liquid state. A pressure regulator is in particular provided between the heating device and the storage container. If a tubular fuel rod is used as the heating device, the tubular fuel rod can comprise a connection for a storage container with flammable gas in the liquid state on one end, while the opposite end is closed in a gas-tight manner. Ignitable gas flows through a gas inlet opening on the connection side into the fuel rod, emerges through multiple holes, and can be ignited. The gas-tight end of the fuel rod can be welded, bonded, or closed by a pinch-off seam.

The connection for a storage container with flammable gas can in this case, for example, be located on the outside of the carrier frame so that it is accessible from the outside when the heating device is installed. The connection is in this case shielded as much as possible against heat from the heating device. If a storage container is connected to the heating device via a hose, the hose together with a pressure regulator is located outside the carrier frame. The storage container with the flammable gas can thus be positioned in a sufficiently safe state in relation to the flames of the heating device; a flexi hose produced from stainless steel can, for example, be used.

The bearing elements for holding the heating device can be provided in various ways. The bearing elements can, for example, be supports, latching devices, recesses, etc. The bearing elements can, for example, be provided so that the heating device is attachable to the carrier frame once the carrier frame has been completely assembled beforehand. In an alternative embodiment, the introduction of the heating device can, for example, be integrated as a step in the assembly of the grill device. In an embodiment of the present invention, at least one bearing element can, for example, be formed by an opening in the carrier frame into which a portion of the heating device is inserted with play.

The heating device can thus be inserted in a simple manner into an opening and also removed again from the opening. This in particular arises in the case of heating devices in the form of fuel rods which are pushed through an opening. Both bearing elements can, for example, be provided as opposite openings into which the heating device is inserted with play.

In order to increase the safety of the grill device, a movement of the heating device in the direction between the two bearing elements can, for example, be delimited by at least one blocking element on the heating device. The heating device can thus not be pulled or pushed unintentionally out of the carrier frame. Such a blocking element can also be provided in various ways. It should be designed so that, with the heating device installed, the blocking element delimits the movement of the heating device between the two bearing elements, i.e., a slight movement can be permitted as an option. In order to remove the heating device, the blocking element can, however, be overcome with simple pulling and/or turning movements of the heating device.

Outer or inner blocking elements can, for example, be used in this case. An outer blocking element is located on the outside of the carrier frame while an inner blocking element is located on the inside of the carrier frame. An opening inside the carrier frame can in this case receive a portion of the heating device so that it is held in the opening as a result of positive locking closure when the grill device is being operated. The positive locking closure can be released, however, for dismantling the grill device with simple pulling and/or turning movements of the heating device.

In an embodiment of the present invention, a blocking element used for this purpose can, for example, be formed by a fastening portion which protrudes from the heating device at an angle α to the longitudinal axis of the heating device, and which has a height H in the direction which is greater than the height h of the opening of a bearing element. This refers to the operating state of the grill device in which the grill device is placed on a substantially horizontal plane. The fastening portion in particular protrudes at an angle α of approximately 90° with respect to the longitudinal axis of the heating device. If, for example, a horizontally extending slot with a height h is used as an opening, an outer blocking element can comprise such a fastening portion which is angled either downward or upward. The fastening portion is situated on the outside of the carrier frame and strikes against the outside when it is pulled inward with the heating device as it does not pass through the slot.

In order to be able to mount the heating device with the angled fastening portion on the carrier frame, the heating device is tilted slightly about the longitudinal axis of the slot in the carrier frame, as a result of which the fastening portion is guidable with a tilting movement through the slot. The movement is carried out in the reverse direction for removing the heating device. The blocking element consequently delimits the movement of the heating device only when the heating device is ready for operation, which is removable, however, as a result of simple pulling and/or turning movements. Securement of the heating device inside the grill device is thus provided, whereby the heating device is nevertheless releasable in a simple and intuitive manner without any tools.

A blocking element can also be formed by a widened projection, the width B of which is greater than the width b of the opening of a bearing element. Such a blocking element can, for example, be provided as an inner blocking element on the inside of the carrier frame. The heating device can thus be prevented from being pushed outward through an opening. This is particularly advantageous in the case of a tubular fuel rod because said fuel rod could otherwise be pushed unobstructedly through two opposite openings.

In an embodiment of the present invention, an inner blocking element and an outer blocking element can, for example, only be provided at one end of the heating device so that the heating device is delimited against a movement inward and outward in an opening. Blocking elements at an opposite opening can then be omitted. If a tubular fuel rod is, for example, used as the heating device, the tubular fuel element can in one embodiment be provided so that a bearing element is provided as a horizontal slot in the carrier frame, through which a flattened, angled fastening portion at the end of the fuel rod is guided in order to form an outer blocking element. The described projection is also provided as an inner blocking element at the end of the fuel rod. The opposite bearing element is in contrast provided as a through-opening through which the other end of the fuel rod can be guided.

The advantage of a slot as the bearing element in combination with a flattening at the end of a round fuel rod, the flattening being pushed through the slot, is additionally that the fuel rod can also be thereby secured against rotation about its longitudinal axis. The dimensions of the flattening and of the slot are chosen correspondingly so that the flattening is only able to rotate as little as possible or even is not able to rotate at all about the longitudinal axis of the fuel rod within the slot. This protection against rotation in a bearing element can, however, also be provided in another manner. For example, the fuel rod could have entirely or at least in part a polygonal cross section which is secured against rotation about its longitudinal axis in a correspondingly provided opening in the carrier frame. Protection against rotation which is, however, also again releasable via simple pulling and/or turning movements, is consequently, for example, producible in at least one bearing element between the heating device and the carrier frame.

In order to be able to mount a heating device in spite of different types of blocking elements, the introduction of the heating device can, for example, be integrated as a step in the assembly of the grill device. In which assembly steps this is advantageously effected depends substantially on the design of the carrier frame and on the plug-in connections utilized for the connection of the individual parts. In an embodiment of the present invention, the carrier frame can, for example, be formed by at least four side walls which are arranged perpendicularly to one another and which are interconnected with releasable plug-in connections. Various types of plug-in connections can be used in this connection, all plug-in connections being able to be of the same type. Different types of plug-in connections can, however, also be combined together.

It has proved to be advantageous when at least the releasable plug-in connections for the side walls are each formed by hook lugs which can be interlocked with a corresponding insertion slot as a result of a movement in the direction of the edges of the side walls to be connected. If, for example, two side walls arranged perpendicularly to one another are to be connected together via their edges, hook lugs with insertion slots that run in opposite directions are situated on the edges. Hook lugs and insertion slots are plugged into one another as a result of a movement in the direction of the edges and are thereby hooked together. The hook lugs can also be released out of the insertion slots again in the same way. In an embodiment of the present invention, two downwardly directed hook lugs, which are introducible from above into insertion slots on the two other side walls, can, for example, be situated on each of the two opposite side walls.

Such hook lugs and insertion slots can, for example, only be situated on the upper edges of the side walls, while the side walls are connected together by different types of plug-in connections in the lower region. A bottom part which is attached to the four side walls by releasable plug-in connections is, for example, situated below the heating device. Simpler connections can, for example, be chosen for the plug-in connections. This is in particular in each case a hook lug which is hooked in a simple slot in a side wall. It can also be a simple lug which is pushed into a slot. As a result of the combination of different plug-in connections, it is possible to put the grill device together according to a certain schematic diagram without walls or hook lugs having to be put under pressure or even bent. The introduction of the heating device can also be integrated in the schematic diagram. An extremely sturdy and torsion-resistant grill device is produced once assembled.

A bottom part can, for example, be provided as an angled sheet so that a concave draining surface is produced on which a material which drips down from above is collectable. A flame cover can be inserted between the heating device and the cooking grill in order to improve the gas grilling operation of the grill device according to the present invention. The flame cover is also attached to the carrier frame, for example, by releasable plug-in connections, its attachment also being able to contribute to the torsion-resistance of the grill device. The flame cover can, for example, be formed by a roof-shaped sheet which extends with the bearing elements above the heating device between the two walls. The flame cover comprises multiple recesses through which flames are able to pass. Heat can consequently be better distributed to the items to be grilled on the cooking grill.

It can furthermore be provided in an embodiment that the side walls provide supporting feet. This can be achieved as a result of at least one indentation being provided on the underside of at least two side walls. Along with the indentation, supporting feet are formed so that the grill device does not rest on the ground by way of long, continuous edges but by way of at least four supporting feet with shorter edges. This increases the stability of the grill device on uneven ground. This can be supplemented by a further indentation in each of the supporting feet. The grill device can thus be placed with the two indentations on two transversely arranged branches. The stability of the grill device can thereby also be increased, branches being easy to find and consequently not having to be additionally taken along.

The grill device can in this case also be placed onto a flat transport bag in which the components of the grill device are transportable in a flat stack.

Further advantages, characteristics and expedient further developments of the present invention are produced from the following representation of exemplary embodiments by way of the drawings.

An embodiment of a grill device 10 according to the present invention, which is suitable in particular for outdoor activities, such as, for example, hiking tours or for camping, is shown in the drawings. The grill device 10 shown in the present exemplary embodiment includes a carrier frame and a cooking grill 20 which is attached to the carrier frame. The carrier frame is formed by multiple plate-shaped walls, in particular by four side walls 11, 12, 13 and 14. A cuboid-shaped carrier frame with an upper opening is thus formed overall, into which opening the cooking grill 20 is inserted. Two shorter side walls 11 and 12 are in this case connected together via two longer side walls 13 and 14. The form with two shorter side walls 11 and 12 and two longer side walls 13 and 14 is not to be understood, however, in a restricting manner; the description also applies to forms with side walls of the same length or with other ratios between the sides.

The underside of the grill device 10 is closed off by a bottom part 15 which is connected to all side walls 11, 12 and 13, 14. The bottom part 15 in this case is also provided in a plate-shaped manner, but comprises an angulation so that a concave channel is produced which extends between the two shorter side walls 11 and 12. The bottom part 15 thus forms a drip channel which can, for example, be provided in a closed manner.

The grill device 10 also comprises a heating device 30 which is operated with a flammable gas. The heating device 30, in the embodiment, is provided as a fuel rod with a round cross section which comprises multiple outlet openings for the outflow of flammable gas, one outlet opening of which is provided as an example with the reference numeral 34. The outlet openings 34 are arranged spaced apart from one another in a row over the length of the fuel rod 30, multiple rows of which can be provided. The heating device 30 can, however, also have another form. The heating device 30 can, for example, also be provided as a cuboid or a flat plate with multiple outlet openings for the outflow of gas.

The heating device 30 extends between the two shorter side walls 11 and 12 and is held on the two shorter side walls 11 and 12 in respective bearing elements. The bearing elements are formed by openings in the shorter side walls 11 and 12. One opening in the shorter side wall 11 is in this case provided by a slot 50, while one opening in the opposite shorter side wall 12 is provided by a circular recess 51. The tube of the fuel rod 30 comprises a flattening 32 at one end with which it is pushed into the slot 50. The flattening 32 is introduced, for example, by a pinch-off seam or by a welding via which the tube of the fuel rod 30 is closed in a gas-tight manner at the end. The fuel rod 30 is pushed into the circular recess 51 with its other end. The connection for a storage container with flammable gas in liquid form is also situated at the end of the fuel rod 30 so that at this end there is a gas inlet opening 31 via which gas is able to flow into the fuel rod 30 in order then to escape through the outlet openings 34. The end with the flattening 32 is in contrast provided in a gas-tight manner.

The gas inlet opening 31, and consequently the connection for a storage container with gas in liquid form, is situated in the mounted state on the outside of the carrier frame formed by the side walls, i.e., on the outside of the shorter side wall 12. This can in particular be seen in the view shown in FIG. 1. The fuel rod 30 consequently projects with a certain length beyond the side wall 12.

The roof-shaped flame cover 40 is arranged above the heating device 30. The flame cover is provided in a manner that is known for conventional grills. It in particular comprises multiple flame openings 41 which are arranged spaced apart from one another in two lateral rows.

The two longer side walls 13 and 14 each comprise on their bottom edges a central indentation via which two supporting feet 16, 17 and 18, 19 are in each case formed. One further, smaller, indentation is additionally formed in the bottom edges of each of the supporting feet 16, 17, 18, 19. The grill device can optionally be set up on transversely placed branches with said indentions, as is shown via the broken lines in FIG. 1.

The various individual parts of the grill device 10 are connected together by multiple releasable plug-in connections. The four side walls 11, 12, 13, 14 are connected together at their perpendicular edges via plug-in connections which are produced by hook-shaped lugs and insertion slots. The lugs are also designated as hook lugs below as they protrude from the side walls like hooks. The shorter side wall 11 comprises on each of its lateral edges a hook lug 70 and 71, while the opposite shorter side wall 12 comprises two hook lugs 72 and 73 on its lateral edges. The hook lugs are situated in the upper region of the shorter side walls 11, 12 so that they are insertable from above into corresponding slots in the two other longer side walls 13 and 14. The longer side wall 13 comprises two such insertion slots 91, 92, while the opposite longer side wall 14 comprises two insertion slots 93, 94.

The bottom part 15 is connected by way of further plug-in connections to the side walls 11, 13 and 14. In the embodiment shown, there is no plug-in connection to the shorter side wall 12 because the shorter side wall 12 can, for example, be mounted last and a further plug-in connection in this region would make insertion of the hook lugs 7, 73 from above into the insertion slots 92, 94 more difficult.

The bottom part 15 comprises four lugs 80, 81, 82, and 83 which are insertable into corresponding slots 60, 61, 62, 63 in the longer side walls 13 and 14. In this case, the lugs 80, 81, 82, 83 are also formed in a hook-shaped manner, the hooks projecting in the direction of the shorter side wall 11. When the lugs 80, 81, 82, 83 are inserted into the slots 60, 61, 62, 63, the bottom part 15 is consequently pressed slightly in the direction of the shorter side wall 11 in order to provide a hook-locking. Two further lugs 84 and 85 protrude on a side of the bottom part 15 facing the shorter side wall 11. The lugs are formed by simple bulges without any holding function. They are consequently inserted simply into corresponding slots 64 and 65 in the shorter side wall 11 and are not in this case hook-locked. The lugs 84 and 85 simply rest in the slots 64 and 65 so that the slots 64, 65 are also to be designated as support slots.

Further support slots 66, 67, 68 and 69 are provided in the shorter side wall 11 and the shorter side wall 12 in order to hold the flame cover 40. The flame cover 40 comprises at each of its ends two simple lugs 42, 43 and 44, 45 therefor which are inserted without hook-locking into the support slots 66, 67, 68 and 69. As a result of the angled roof form of the flame cover 40, the lugs 42, 43, 44, 45, and consequently the support slots 66, 67, 68, 69, are arranged at an angle.

The cooking grill 20 is also connected to the four side walls 11, 12, 13, 14 via lugs and receiving elements. The cooking grill 20 comprises four support teeth 21, 22, 23, and 24 therefor which protrude from the sides. The support teeth can be placed from above in correspondingly formed receiving elements on the side walls which are upwardly open. The receiving elements 26, 27, 28 29 are situated, for example, on the upper edges of the longer side walls 13 and 14 and their cross section widens upward. A further protruding plug-in tooth 25 is additionally formed on the cooking grill 20 which is inserted into a further support slot 90 on the shorter side wall 12.

In the state shown in FIG. 1, the grill device 10 is completely assembled and can be utilized for grilling items to be grilled on the cooking grill 20. A storage container with flammable gas in liquid form is connected to the fuel rod 30 therefor, which can also include the attachment of pressure regulators, pressure valves, hoses, etc. The grill device 10 is sturdy, very torsion-resistant, and safe to handle. The fuel rod 30 is in this case in particular secured against movement within the openings 50 and 51, as will be described by way of FIG. 7.

Figure 5:
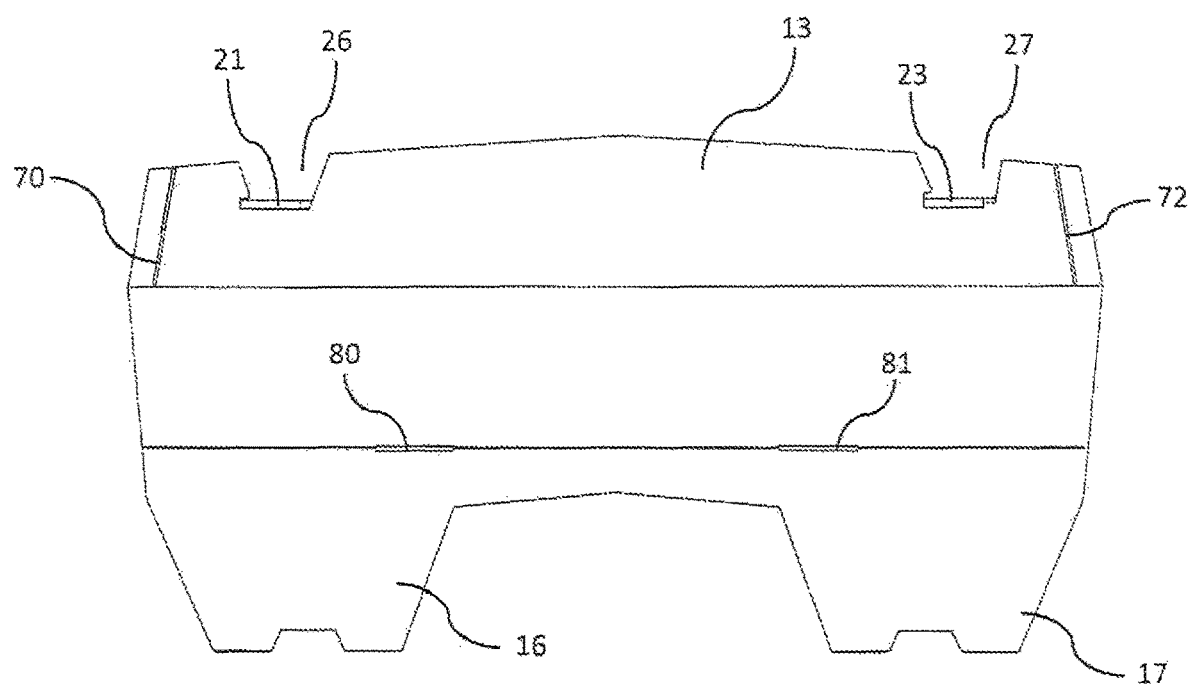
FIG. 5 shows a longitudinal view of the grill device.
Figure 6:
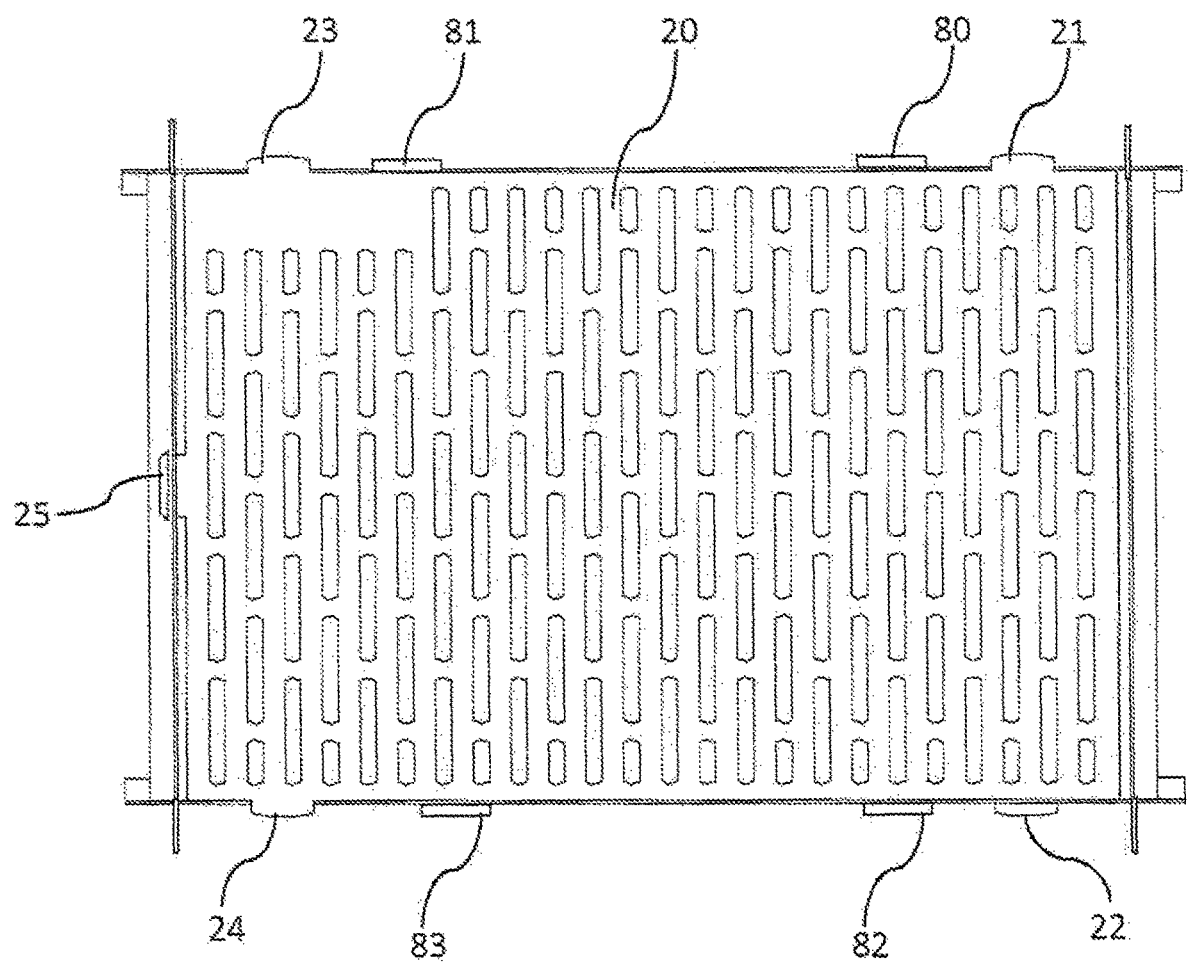
FIG. 6 shows a top view of a grill device.

In order to transfer the grill device 10 from its diverse individual parts into the state in FIG. 1, a given assembly diagram can, for example, be complied with. In particular the two longer side walls 13 and 14 are firstly connected to the shorter side wall 11 via the described plug-in connections. The two longer side walls 13, 14 are spread slightly apart in order to connect the base part to the three side walls 11, 13, 14 via the plug-in connections also described. The end of the fuel rod 30 with the gas inlet opening 31 is additionally pushed from inside through the opening 51 in the side wall 12. In this state, the other end of the fuel rod 30 with the flattening 32 is pushed through the slot 50 in the shorter side wall 11. To this end, the fuel rod 30 is tilted slightly upward about the longitudinal axis of the slot 50 in order to be able to push a highly angled fastening portion 33 on the flattening 32 through the slot 50. This operation is shown by way of an arrow in FIG. 7. As the fuel rod 30 is inserted with play into the circular opening 51, the shorter side wall 12 can be tilted slightly outward in order to push the flame cover 40 with its lugs 42, 43, 44, 45 into the support slots 66, 67, 68, 69. The shorter side wall 12 is pressed in the direction of the opposite shorter side wall 11 in order to be able to hold the flame cover 40 between the two shorter side walls 11, 12. In this state, the shorter side wall 12 can be lowered downward 12 in order to insert the hook lugs 72 and 73 from above into the insertion slots 92 and 94 of the two longer side walls 13, 14. The cooking grill 20 is then inserted and lowered at an angle with its plug-in tooth 25 into the slot 90. In this case, the support teeth 21, 22, 23, 24 can be placed in the receiving elements 26, 27, 28, 29. As can in particular be seen from the side view in FIG. 5, the support teeth 21, 22, 23 and 24 each hook-lock with a projection in the lower region of a side wall of the respective receiving elements 26, 27, 28, 29 when the cooking grill 20 is inserted with its plug-in tooth 25 in the direction of the slot 90. The cooking grill 20 can thus no longer be lifted easily upward out of the receiving elements 26, 27, 28, 29. To this end, the cooking grill 20 must rather first be pulled out of the slot 90 with its plug-in tooth 25 in order to release the hook-locking with the projection of a respective receiving element. An indentation, into which a support tooth 21, 22, 23 and 24 is lowered under a projection during insertion (see, for example, the right-hand receiving element 27 in FIG. 5) can additionally be provided on the bottom of receiving elements 26, 27, 28, 29. The cooking grill 20 is thus secured against a horizontal movement, and the corresponding weight of the cooking grill 20 is held by gravity in the indentation. This protection is eliminated when the cooking grill 20 is lifted with a pulling and tilting movement out of the slot 90 and the receiving elements 26, 27, 28, 29.

Figure 7:
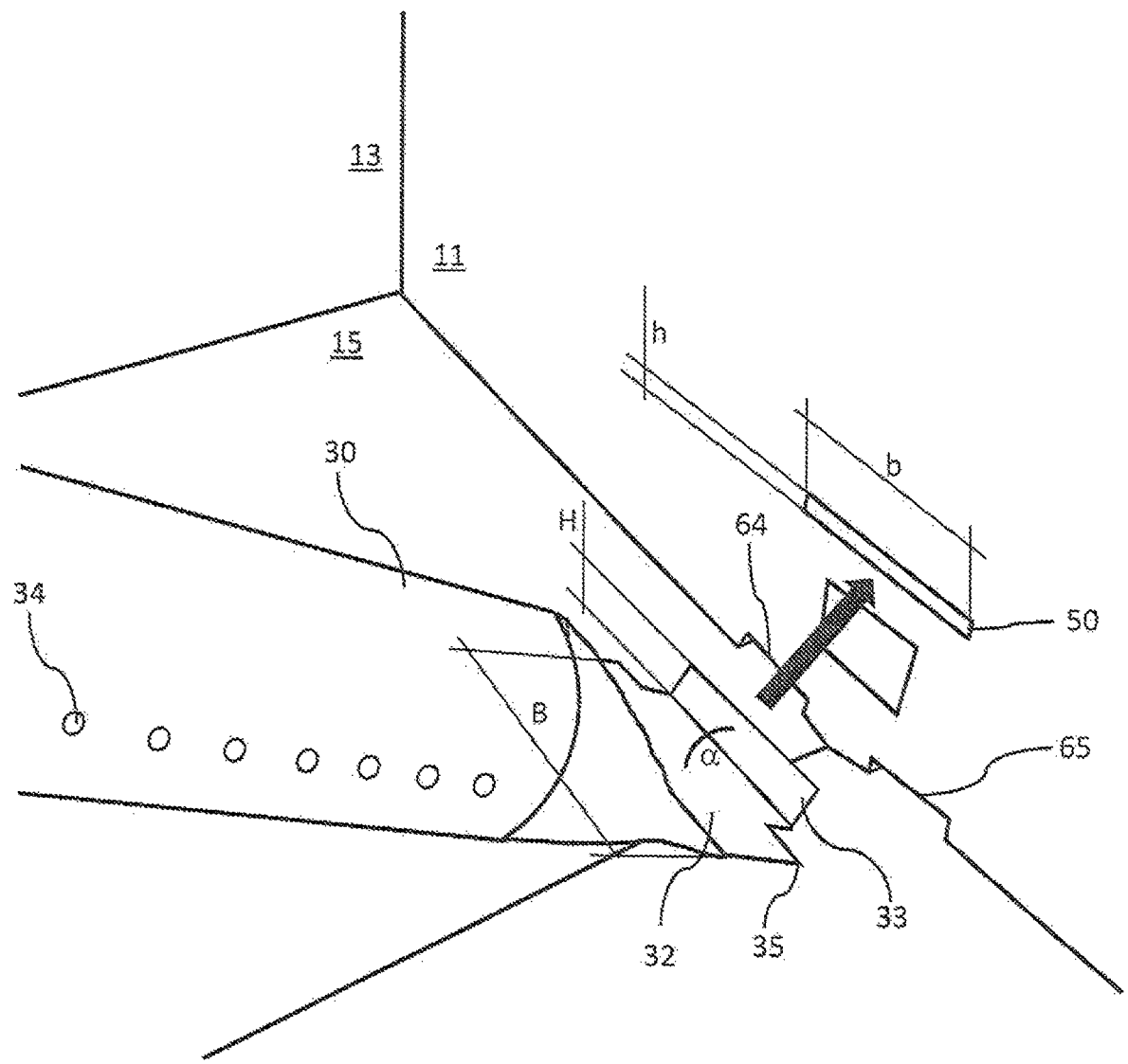
FIG. 7 shows an assembly step when attaching a heating device.

In the end state, the fuel rod 30 is secured between the two openings 50, 51 against a movement as at least one blocking element, for example, two blocking elements, act on the slot 50 (see FIG. 7). A first blocking element is formed by the fastening portion 33 which protrudes at an angle α from the longitudinal axis of the fuel rod 30. The fastening portion 33 here protrudes upward and has in this direction a height H which is greater than the height h of the slot 50. The fastening portion 33 rests on the outside of the shorter side wall 11 and, as a result of a positive locking closure, prevents a movement of the fuel rod 30 in the direction of the opposite shorter side wall 12, as the fastening portion 33 does not pass through the slot 50 in this position. The fuel rod 30 can consequently not be pulled unintentionally out of the grill device 10 through the circular opening 51. If, for example, a hose and/or the storage container for the flammable gas is pulled unintentionally, this does not result in a dangerous situation where a fuel rod 30 with flames is pulled out. The fuel rod 30 is much rather always protected and safely accommodated in the interior of the grill device 10.

Pushing the fuel rod 30 too far through the grill device 10 is certainly also prevented by a further blocking element. To this end, a widened projection 35 is provided on the end-side flattening 32 of the fuel rod 30. This projection 35 has a width B which is greater than the width b of the slot 50 in the shorter side wall 11. The projection 35 consequently strikes against the inside of the shorter side wall 11 when the fuel rod 30 is pressed in this direction. The flattening 32 in the slot 50 additionally brings about a protection against rotation.

The fuel rod 30 is secured in the grill device 10 by the fastening portion 33 and the projection 35 as blocking elements. This protection can, however, be released by simple pulling and/or turning movements when the grill device 10 is disassembled. The previously described assembly steps are carried out in the reverse order, i.e., the shorter side wall 12 is pulled upward out of the insertion slots 92, 94, etc. The releasing of the fuel rod 30 out of the slot 50 is effected as a result of pulling/tilting the fuel rod 30 upward. All further plug-in connections can then be released and the fuel rod also removed from the shorter side wall 12. The entire grill device 10 is present at the end in multiple flat individual parts which can be stacked one on top of another so that they are able to be transported, for example, in a bag or in a backpack.

Figure 3:
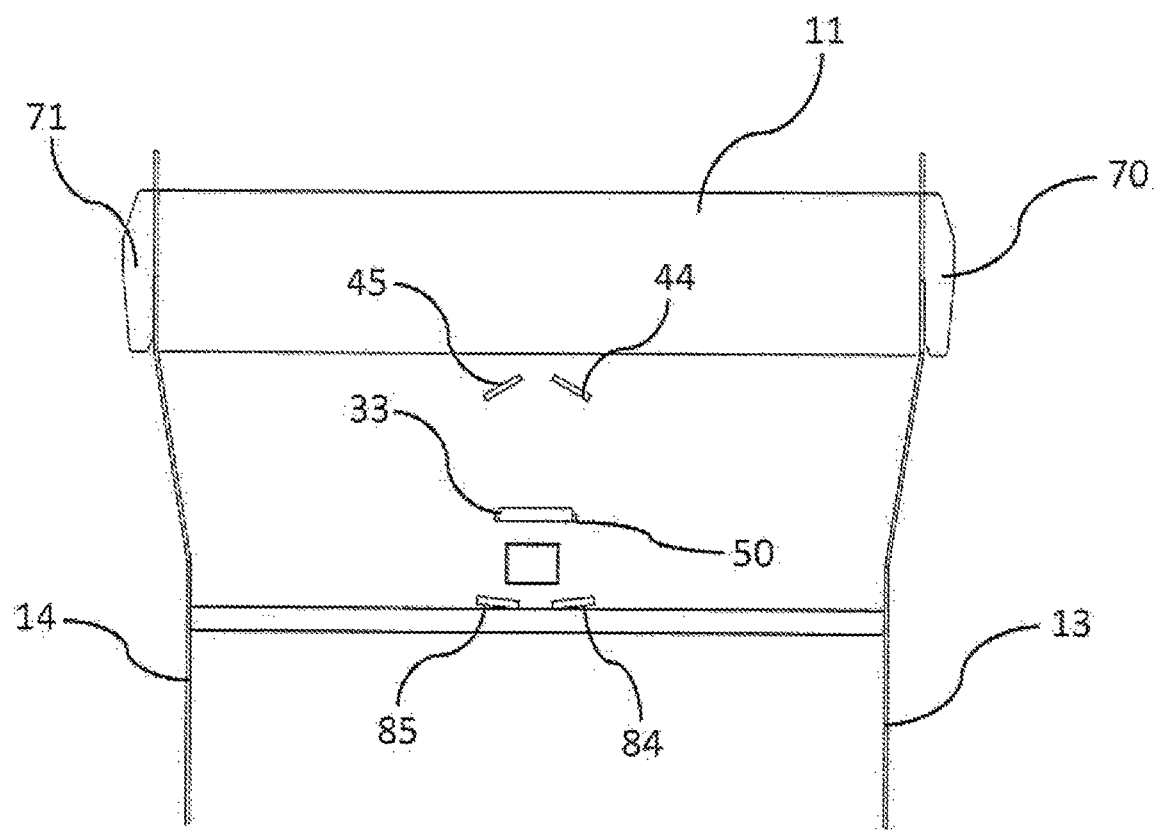
FIG. 3 shows a first side view of the grill device.
Figure 4:
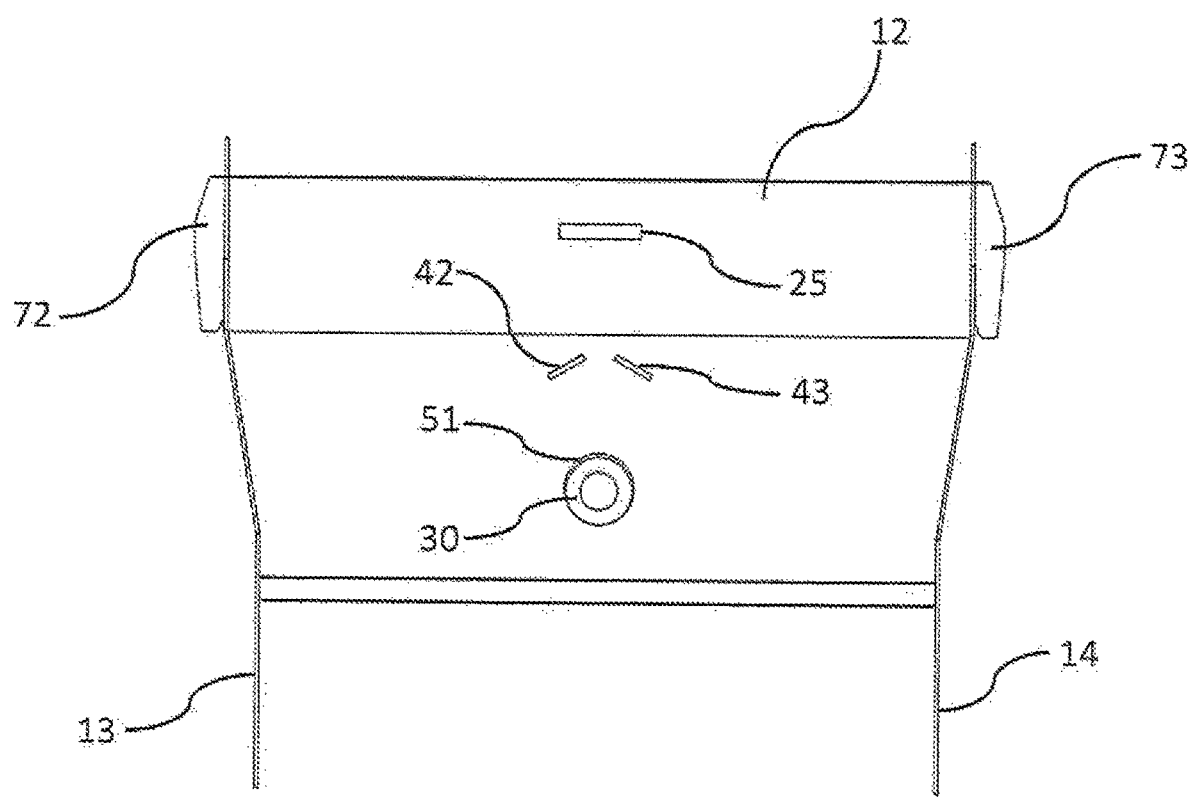
FIG. 4 shows a second side view of the grill device.

An opening is situated in the region of the slot 50 as can be seen, for example, in FIG. 3. The heating device 10 can be ignited with a flame or spark source through this opening.

The present invention is not limited to embodiments described herein; reference should be had to the appended claims. The features mentioned individually in the claims can thereby be combined with one another in any desired, technically sensible manner and can demonstrate further designs of the present invention. The above description thereby characterizes and specifies the present invention, in particular additionally in conjunction with the drawings.

LIST OF REFERENCES NUMERALS

| | |
|---|---|
| 10 | Grill device |
| 11, 12 | Side wall, shorter side wall |
| 13, 14 | Side wall, longer side wall |
| 15 | Bottom part |
| 16, 17, 18, 19 | Supporting foot |
| 20 | Cooking grill |
| 21, 22, 23, 24 | Support tooth |
| 25 | Plug-in tooth |
| 26, 27, 28, 29 | Receiving element |
| 30 | Heating device, fuel rod |
| 31 | Gas inlet opening |
| 32 | Flattening |
| 33 | Fastening portion, blocking element |
| 34 | Outlet opening |
| 35 | Projection, blocking element |
| 40 | Flame cover |
| 41 | Flame opening |
| 42, 43, 44, 45 | Lug |
| 50 | Bearing element, opening, slot |
| 51 | Bearing element, opening, circular recess |
| 60, 61, 62, 63 | Slot |
| 64, 65, 66, 67, 68, 69 | Support slot |
| 70, 71, 72, 73 | Hook lug |
| 80, 81, 82, 83, 84, 85 | Lug |
| 90 | Grill fixing, slot |
| 91, 92, 93, 94 | Insertion slot |
| α | Angle of fastening portion 33 to fuel rod 30 |
| b | Width of slot 50 |
| B | Width of projection 35 |
| h | Height of slot 50 |
| H | Height of fastening portion 33 |

What is claimed is:

1. A foldable grill device comprising:
a cooking grill;
a heating device which is configured to be operated with a flammable gas; and
a carrier frame which is configured hold the cooking grill, the carrier frame comprising,
  a plurality of plate-shaped walls, and
  at least two opposite bearing elements in which the heating device is held so as to be releasable,
wherein,
the plurality of plate shaped walls are interconnected via releasable plug-in connections so that a release of the releasable plug-in connections converts the foldable grill device into a transport and storage state in which the plurality of plate-shaped walls and the cooking grill are placed one on top of another to form a flat stack,
the heating device is provided as a tubular fuel rod which a first end, a second end which is arranged opposite to the first end, and a plurality of outlet openings for an outflow of the flammable gas,
a connection for a storage container which comprises the flammable gas in a liquid state is arranged on the first end,
the tubular fuel rod is closed in a gas-tight manner and has a flattening at the second end,
the two opposite bearing elements each are formed by an opening in the carrier frame which is configured so that a portion of the tubular fuel rod is insertable with a play,
one of the at least two bearing elements is provided as a slot in the carrier frame through which the flattening of the tubular fuel rod is pushed,
the tubular fuel rod comprises at least one blocking element,
a movement of the tubular fuel rod in a direction between the two opposite bearing elements is delimited by the at least one blocking element on the tubular fuel rod, and the at least one blocking element comprises at least one of an outer blocking element which is arranged on an outside of the carrier frame and an inner blocking element which is arranged on an inside of the carrier frame.

2. The foldable grill device as recited in claim 1, wherein the connection for the storage container is arranged so as to be on an outside of the carrier frame.

3. The foldable grill device as recited in claim 1, wherein, one of the at least two opposite bearing elements comprises an opening having a height, and
one of the at least one blocking element is formed by a fastening portion which is configured to protrude from the heating device at an angle to a longitudinal axis of the heating device, and which comprises a height which is greater than the height of the opening of the one of the at least two opposite bearing elements.

4. The foldable grill device as recited in claim 3, wherein, the one of the at least two opposite bearing elements further comprises a width, and
one of the at least one blocking element is formed by a widened projection having a width which is greater than the width of the opening of the one of the at least two opposite bearing elements.

5. The foldable grill device as recited in claim 1, wherein the plurality of plate-shaped walls of the carrier frame comprises at least four side walls which are arranged perpendicular to one another and which are interconnected via the releasable plug-in connections.

6. The foldable grill device as recited in claim 5, wherein at least two of the at least four side walls comprise an indentation on an underside thereof.

7. The foldable grill device as recited in claim 5, wherein, the releasable plug-in connections are each formed by hook lugs and by insertion slots, and
each of the hook lugs are configured to mesh with one of the insertion slots as a result of a movement in a direction of edges of the at least four side walls to be connected.

8. The foldable grill device as recited in claim 5, wherein the plurality of plate-shaped walls further comprises a bottom part which is attached to the carrier frame via the releasable plug-in connections below the heating device.

9. The foldable grill device as recited in claim 1, further comprising:
a flame cover which is attached to the carrier frame via the releasable plug-in connections between the heating device and the cooking grill.

10. A foldable grill device comprising:
a cooking grill;
a heating device which is provided as a tubular fuel rod and which is configured to be operated with a flammable gas, the heating device comprising,
a first end,
a second end which is arranged opposite to the first end, the second end comprising a horizontal flattening and being closed in a gas-tight manner, and
a plurality of outlet openings for an outflow of the flammable gas; and
a carrier frame which is configured hold the cooking grill, the carrier frame comprising,
a plurality of plate-shaped walls, and
at least two opposite bearing elements in which the heating device is held so as to be releasable, the at least two opposite bearing elements each being formed by an opening in the carrier frame which is configured so that a portion of the tubular fuel rod is insertable with a play,
wherein,
the plurality of plate shaped walls are interconnected via releasable plug-in connections so that a release of the releasable plug-in connections converts the foldable grill device into a transport and storage state in which the plurality of plate-shaped walls and the cooking grill are placed one on top of another to form a flat stack,
the heating device is not screw-connected, riveted and/or welded-on, but is releasable from the carrier frame as a part of the foldable grill device,
a length of the first end of the heating device projects beyond one of the plurality of plate-shaped walls so as to be on an outside of the carrier frame, and
one of the at least two bearing elements is provided as a horizontal slot in the carrier frame through which the horizontal flattening of the second end of the tubular fuel rod is pushed so as to be on the outside of the carrier frame.

11. The foldable grill device as recited in claim 10, wherein,
a connection for a storage container which comprises the flammable gas in a liquid state is arranged on the first end of the heating device, and
the connection for the storage container is arranged so as to be on the outside of the carrier frame.

12. The foldable grill device as recited in claim 10, wherein,
the heating device further comprises at least one blocking element, and
a movement of the heating device in a direction between the at least two opposite bearing elements is delimited by the at least one blocking element on the heating device.

13. The foldable grill device as recited in claim 12, wherein the at least one blocking element comprises at least one of an outer blocking element which is arranged on an outside of the carrier frame and an inner blocking element which is arranged on an inside of the carrier frame.

14. The foldable grill device as recited in claim 12, wherein,
the horizontal slot of the one of the at least two opposite bearing elements comprises a height, and
one of the at least one blocking element is formed by a fastening portion which is configured to protrude from the heating device at an angle to a longitudinal axis of the heating device, and which comprises a height which is greater than the height of the opening of the one of the at least two opposite bearing elements.

15. The foldable grill device as recited in claim 12, wherein,
the horizontal slot of the one of the at least two opposite bearing elements comprises a width, and
one of the at least one blocking element is formed by a widened projection having a width which is greater than the width of the opening of the one of the at least two opposite bearing elements.

16. The foldable grill device as recited in claim 10, wherein the plurality of plate-shaped walls of the carrier frame comprises at least four side walls which are arranged perpendicular to one another and which are interconnected via the releasable plug-in connections.

17. The foldable grill device as recited in claim 16, wherein at least two of the at least four side walls comprise an indentation on an underside thereof.

18. The foldable grill device as recited in claim 16, wherein,
- the releasable plug-in connections are each formed by hook lugs and by insertion slots, and
- each of the hook lugs are configured to mesh with one of the insertion slots as a result of a movement in a direction of edges of the at least four side walls to be connected.

19. The foldable grill device as recited in claim 16, wherein the plurality of plate-shaped walls further comprises a bottom part which is attached to the carrier frame via the releasable plug-in connections below the heating device.

20. The foldable grill device as recited in claim 10, further comprising:
- a flame cover which is attached to the carrier frame via the releasable plug-in connections between the heating device and the cooking grill.

* * * * *